No. 879,854.  
E. B. CRAM.  
POWER DRIVING MECHANISM FOR COMPUTING TYPE WRITERS.  
APPLICATION FILED DEC. 9, 1903.

PATENTED FEB. 25, 1908.

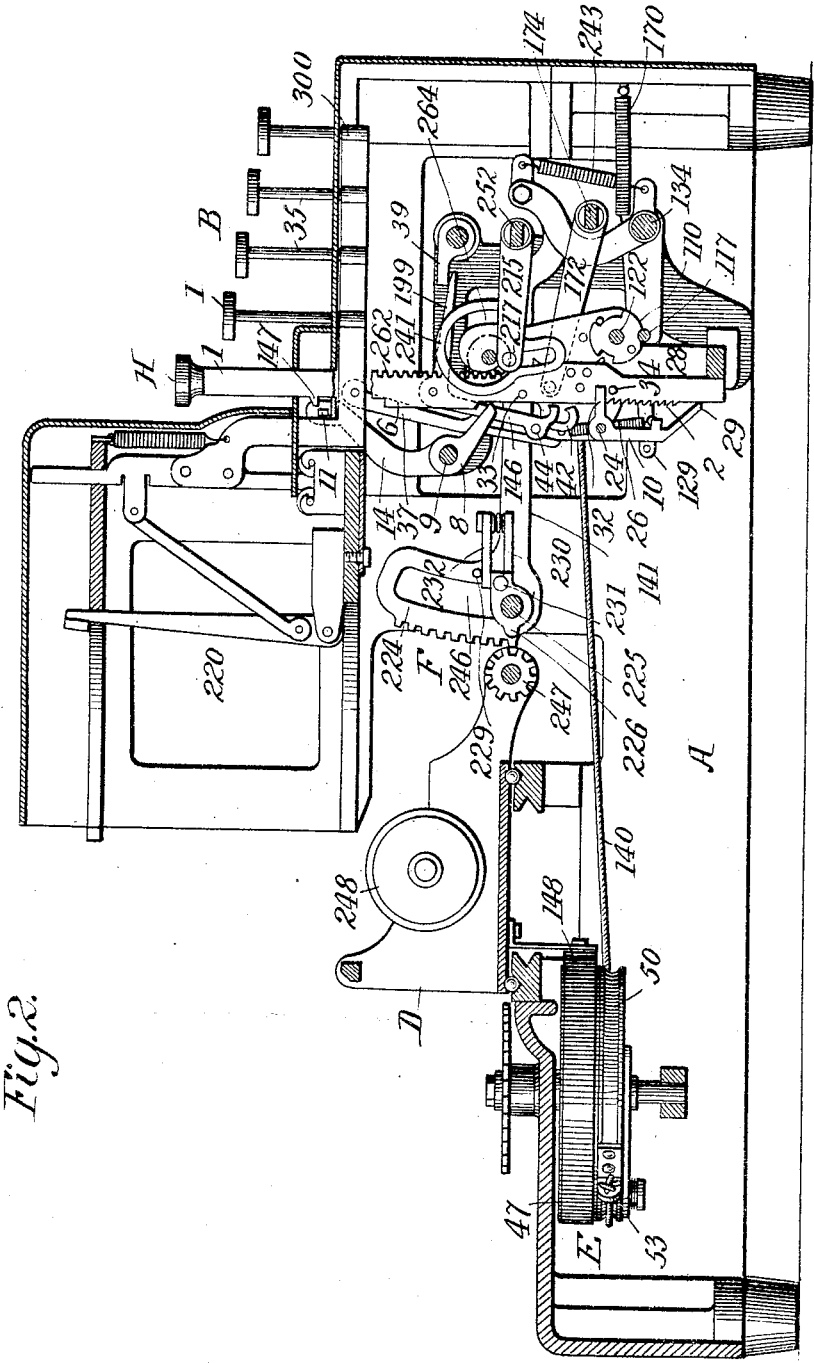

No. 879,854. PATENTED FEB. 25, 1908.
E. B. CRAM.
POWER DRIVING MECHANISM FOR COMPUTING TYPE WRITERS.
APPLICATION FILED DEC. 9, 1903.
10 SHEETS—SHEET 3.
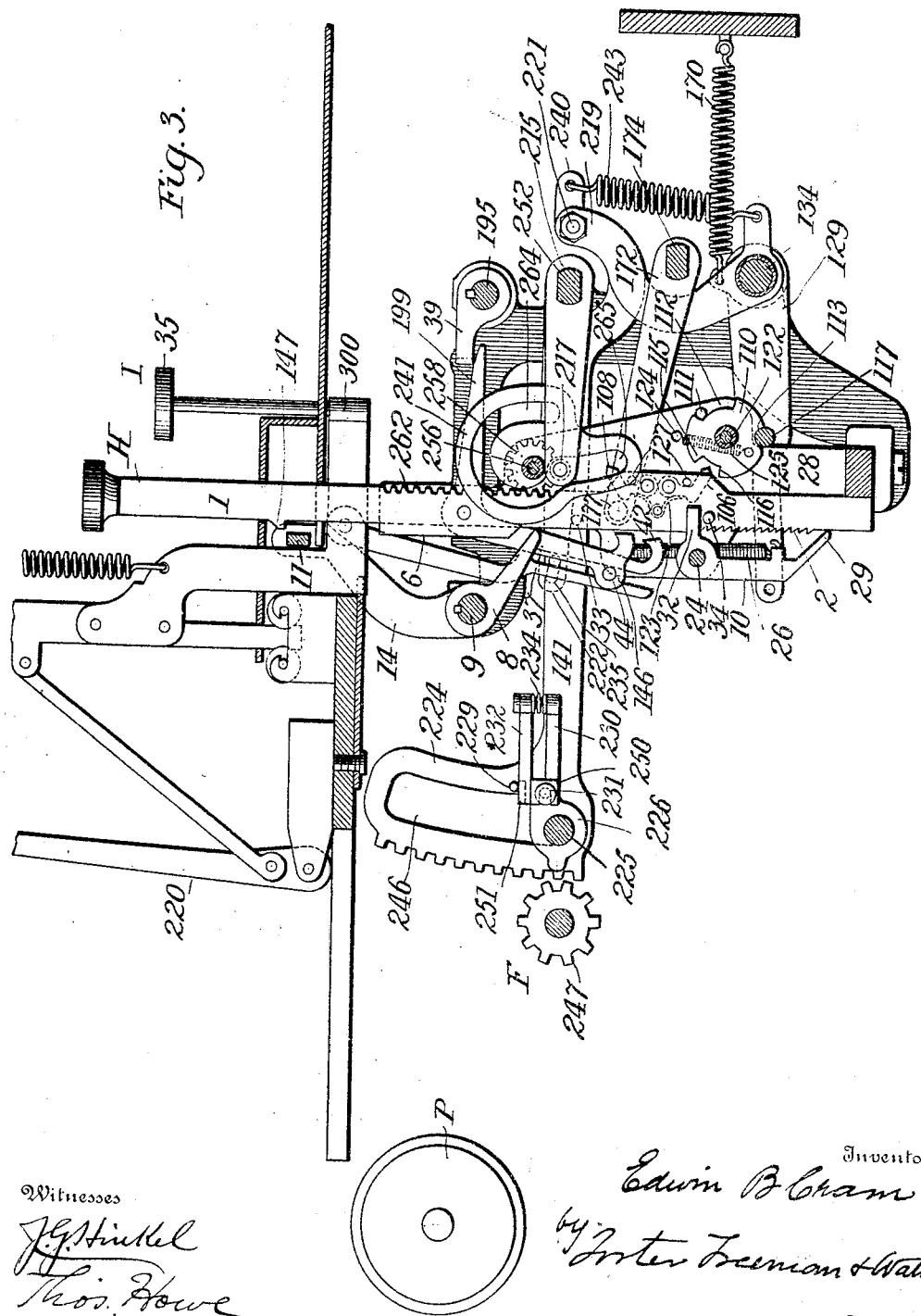

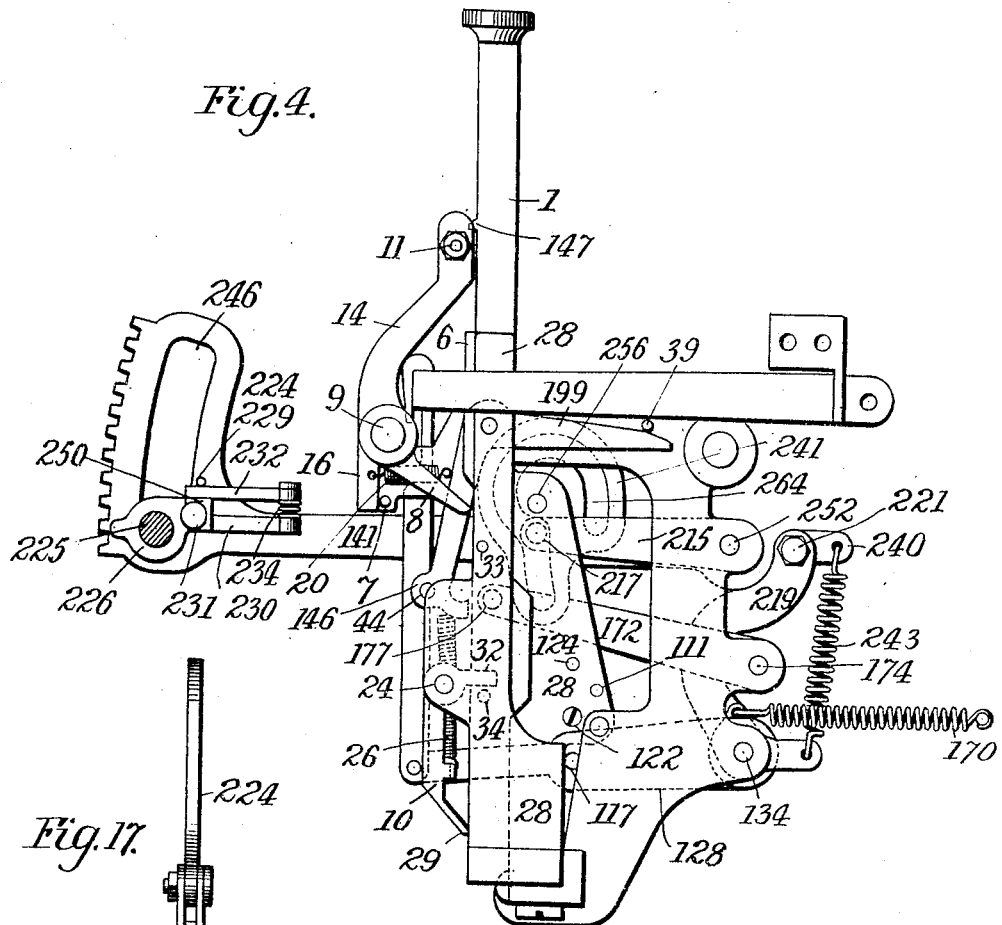
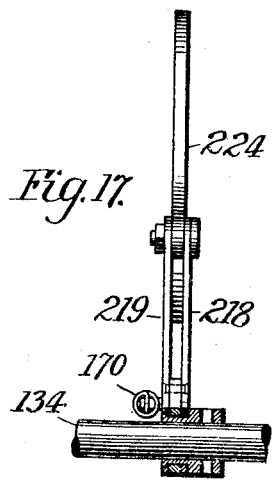
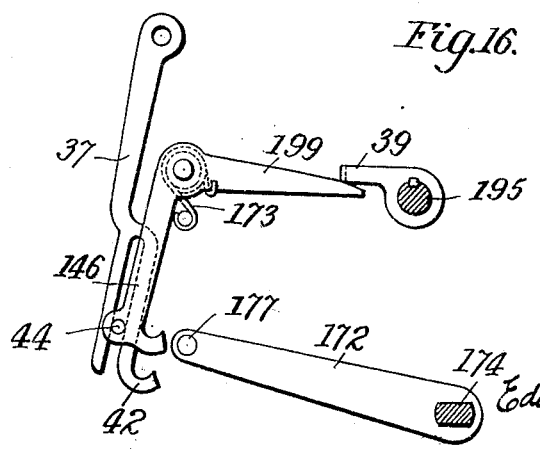

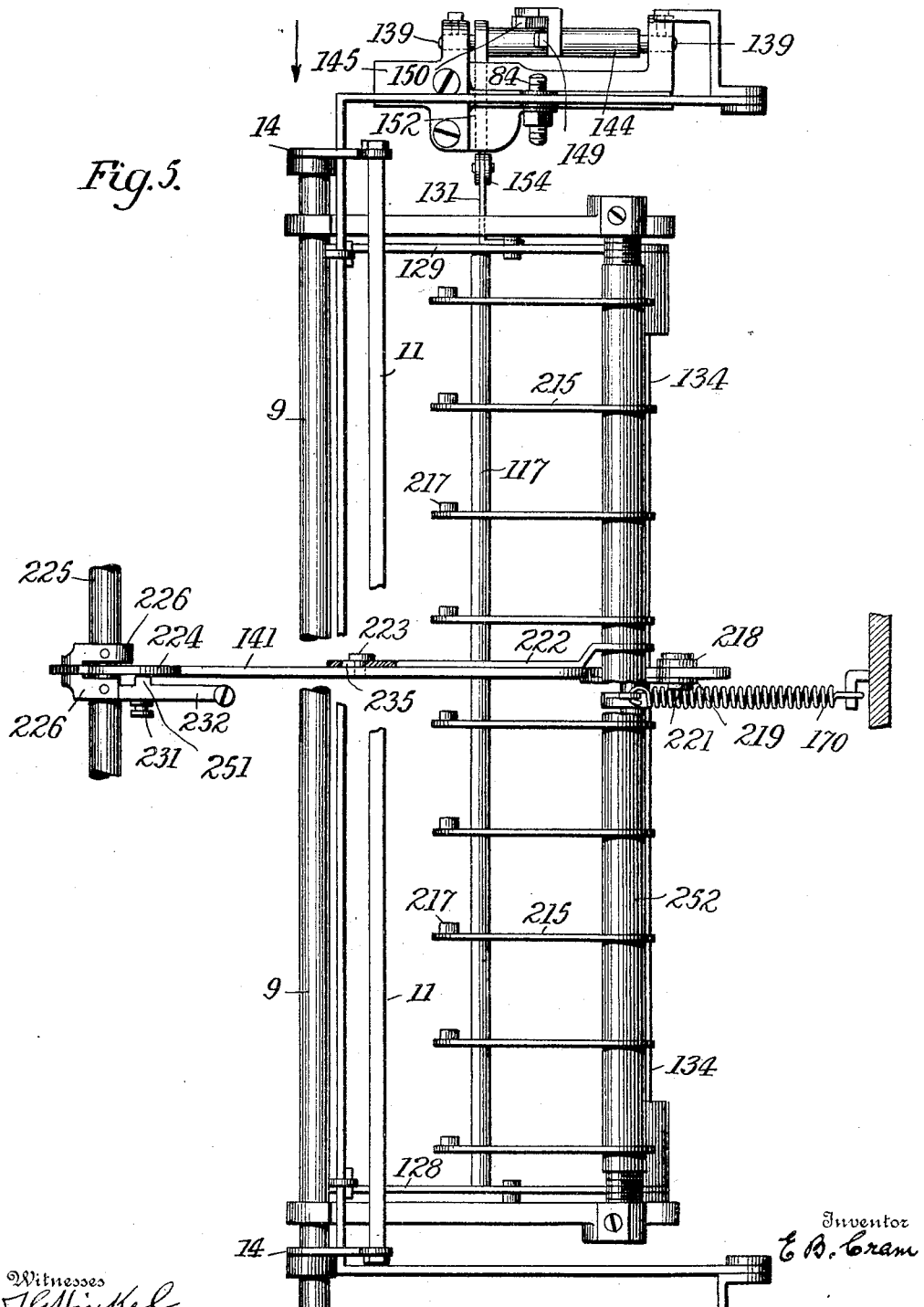

No. 879,854. PATENTED FEB. 25, 1908.
E. B. CRAM.
POWER DRIVING MECHANISM FOR COMPUTING TYPE WRITERS.
APPLICATION FILED DEC. 9, 1903.
10 SHEETS—SHEET 6.
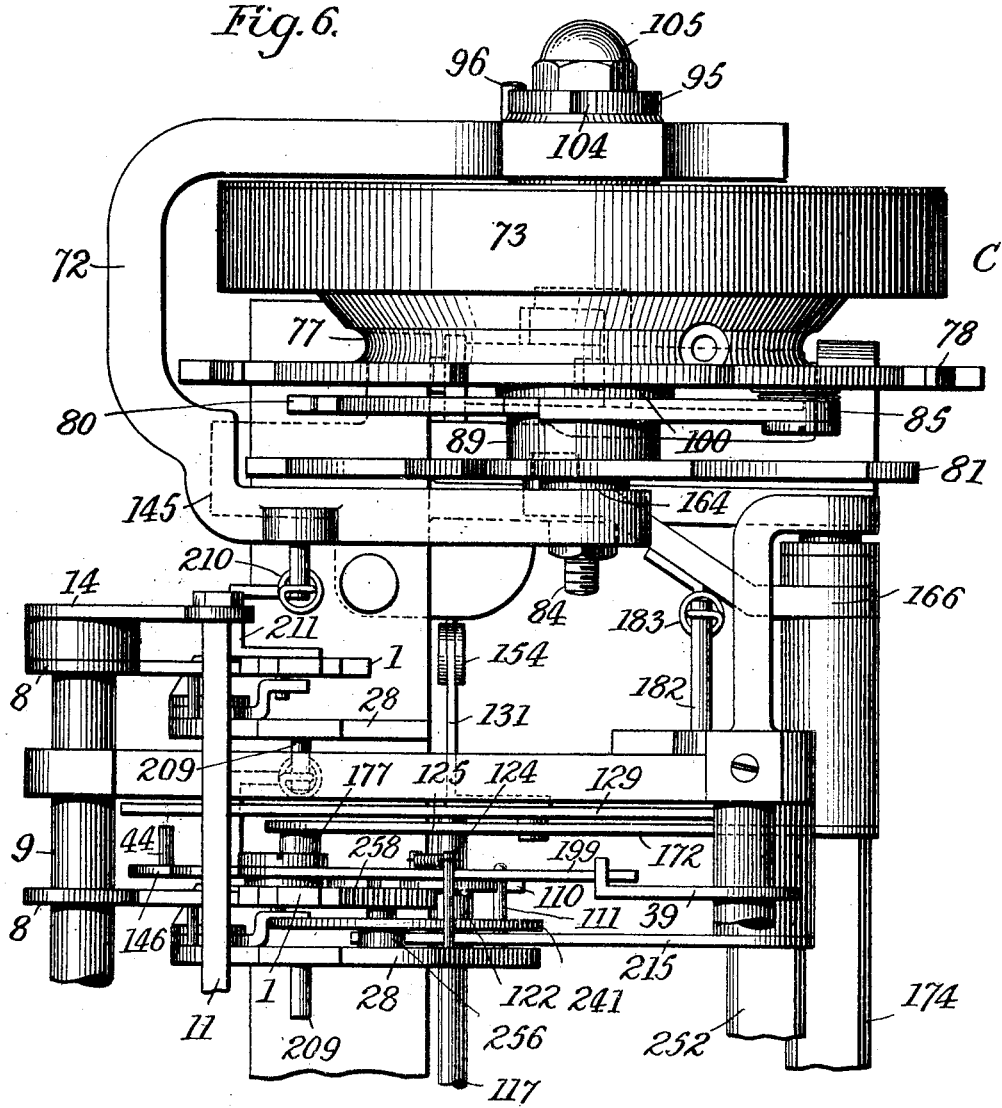
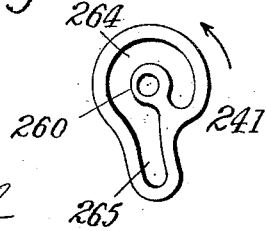
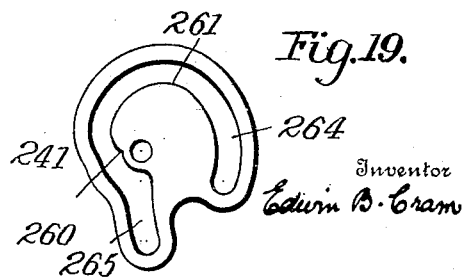

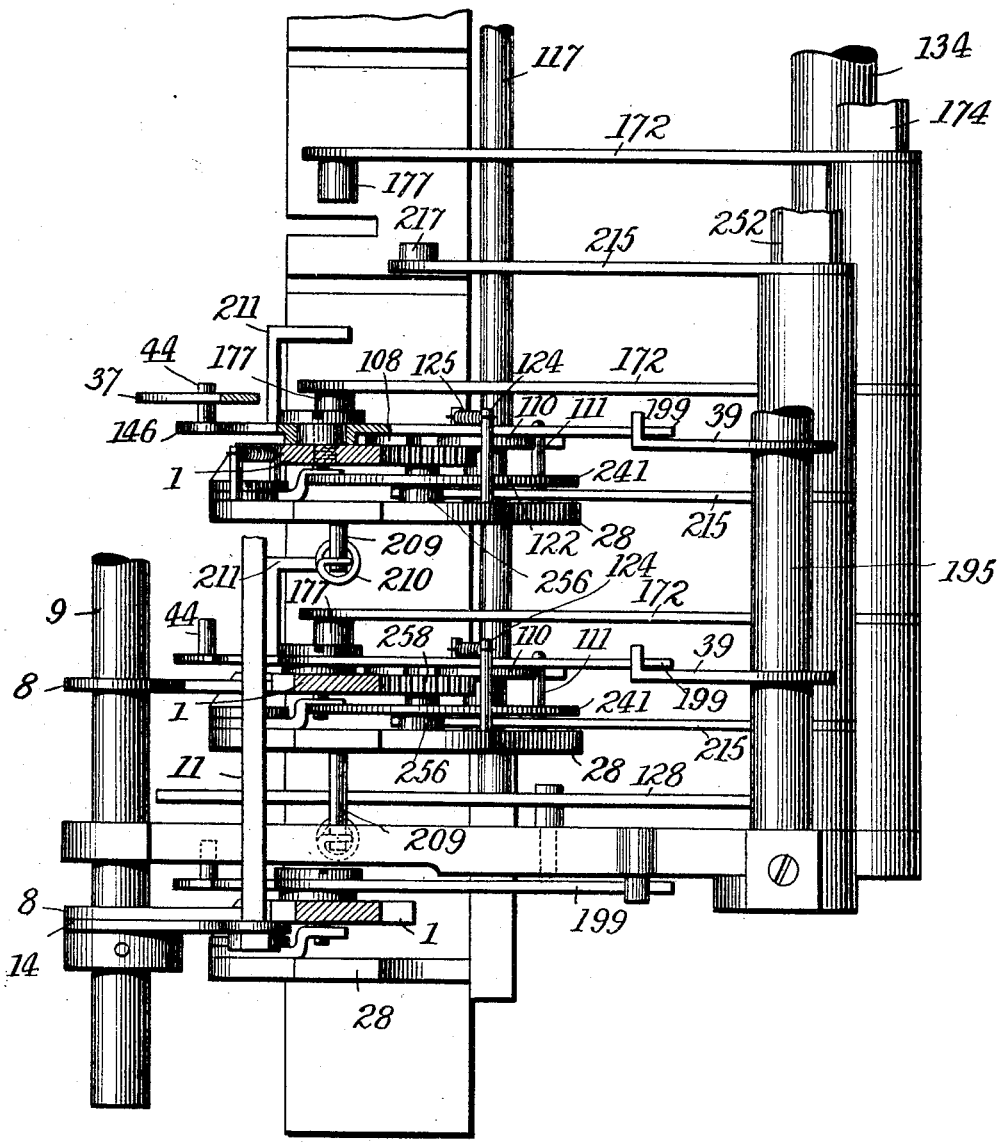

No. 879,854. PATENTED FEB. 25, 1908.
E. B. CRAM.
POWER DRIVING MECHANISM FOR COMPUTING TYPE WRITERS.
APPLICATION FILED DEC. 9, 1903.
10 SHEETS—SHEET 8.
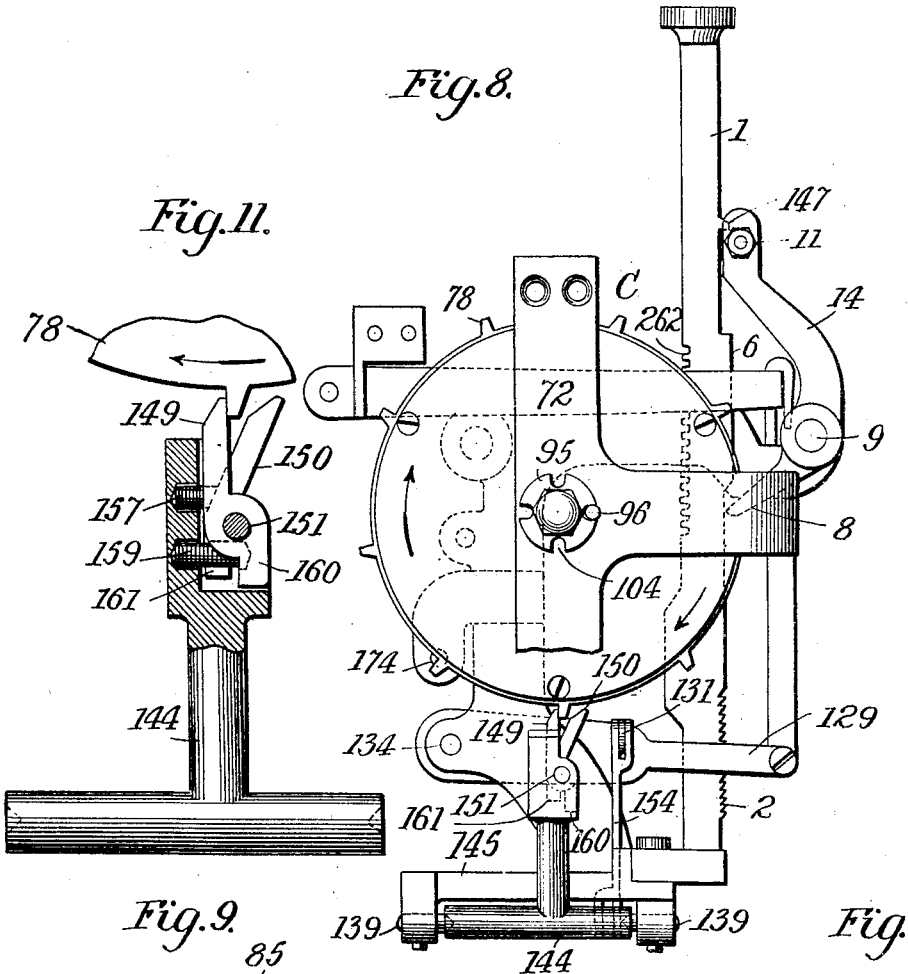
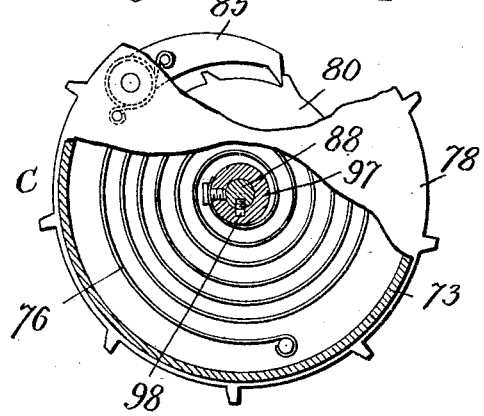
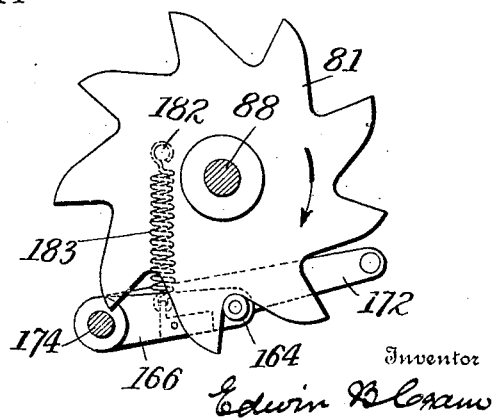

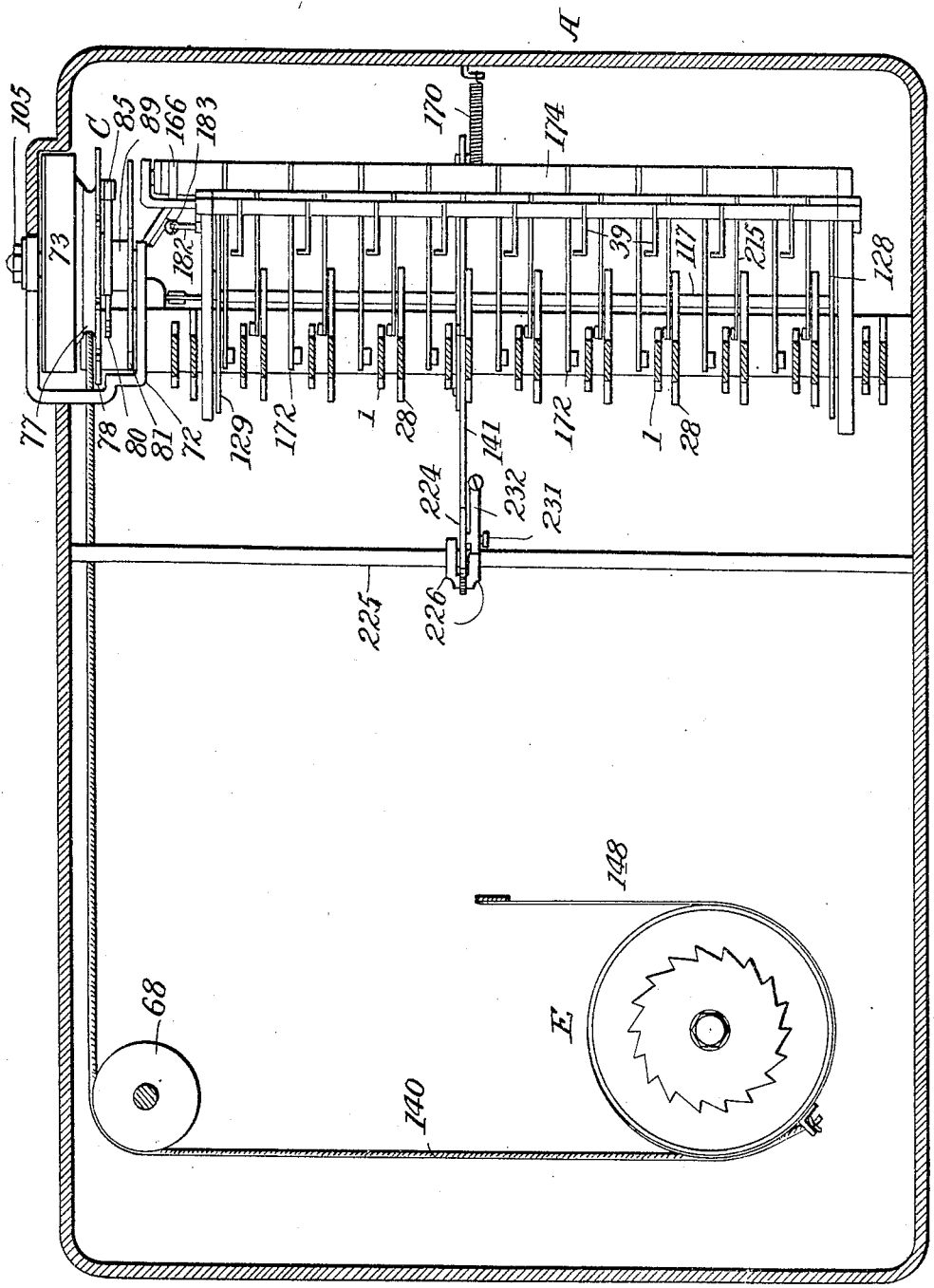

UNITED STATES PATENT OFFICE.

EDWIN B. CRAM, OF BROOKLYN, NEW YORK, ASSIGNOR TO NEW YORK ADDING TYPEWRITER COMPANY, OF ORANGE, NEW JERSEY, A CORPORATION OF MISSOURI.

POWER DRIVING MECHANISM FOR COMPUTING TYPE-WRITERS.

No. 879,854.   Specification of Letters Patent.   Patented Feb. 25, 1908.

Application filed December 9, 1903. Serial No. 184,451.

*To all whom it may concern:*

Be it known that I, EDWIN B. CRAM, a citizen of the United States, and resident of Brooklyn, Kings county, New York, have invented certain new and useful Improvements in Power Driving Mechanism for Computing Type-Writers, of which the following is a specification.

Figure 1:
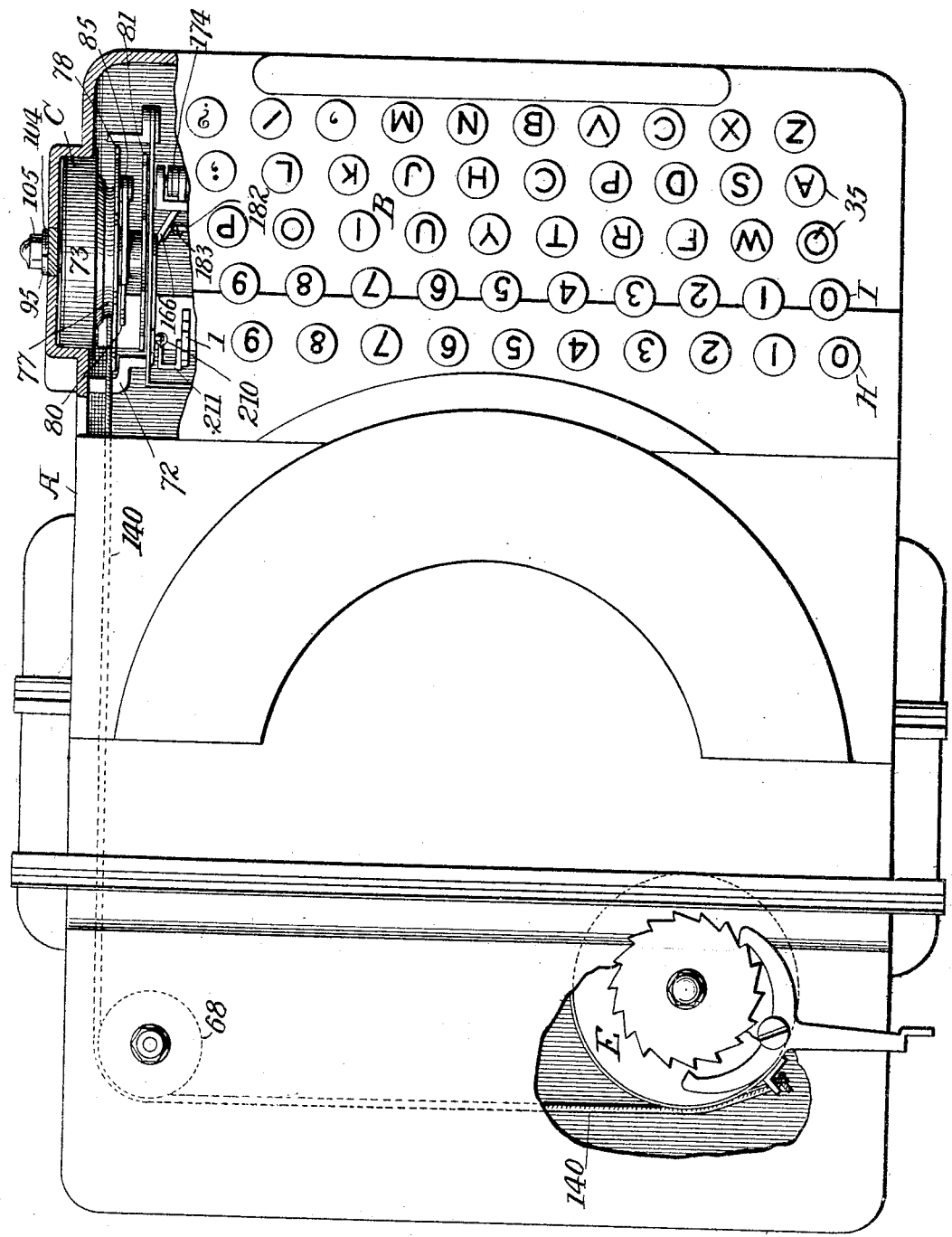
Figure 12:
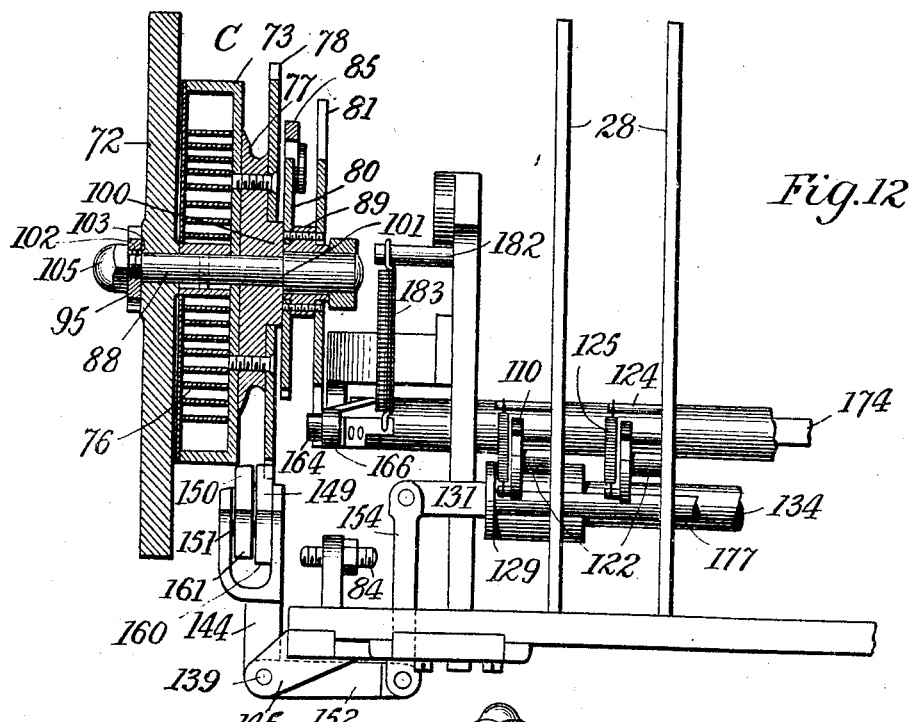
Figure 13:
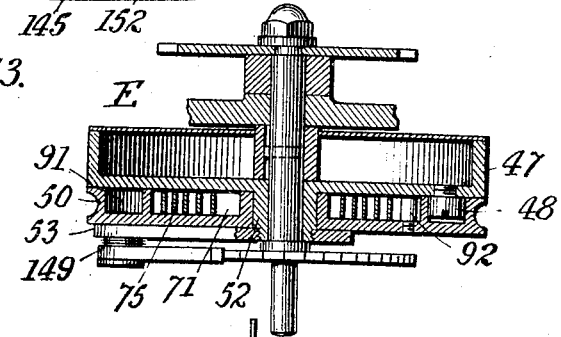
Figure 14:
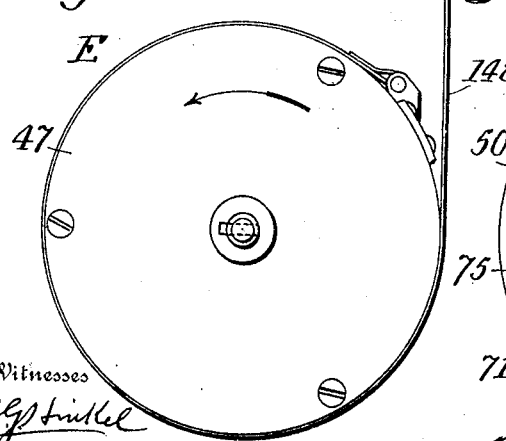
Figure 15:
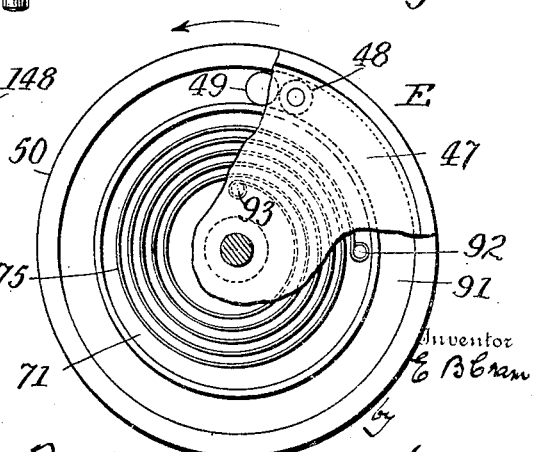

My invention relates to computing typewriters and my invention consists in a machine provided with type writing and adding mechanisms, the former capable of separate and independent operation, means for connecting the same for conjoint operation and a motor for operating them when joint action is required, and in certain details of construction substantially as set forth hereinafter and as illustrated in the accompanying drawings in which:

Figure 1 is a plan view of the entire machine, the frame partly broken away; Fig. 2 is a vertical longitudinal section; Fig. 3 is a vertical longitudinal section of the front portion of the machine, on a larger scale than Fig. 2; Fig. 4 is a side elevation of the devices for operating the adding mechanism; Fig. 5 is a plan view of the sector for operating the adding wheels and some of the adjacent parts; Fig. 6 is an enlarged part plan view of the motor and adjuncts; Fig. 7 is a similar view of the parts at the opposite end of the machine; Fig. 8 is a side elevation of the motor, its supporting bracket, and other operating parts, looking in the direction of the arrow Fig. 5; Fig. 9 is an elevation showing the motor, the casing being partly broken away and partly in section; Fig. 10 is a detail view of the star wheel and the devices for transmitting movement to the power shaft; Fig. 11 is an enlarged sectional detail of the dogs, escapement frame and adjuncts for controlling the escape wheel of the motor; Fig. 12 is a transverse sectional elevation of the motor, showing also in elevation the means for transmitting movement from the motor to the power shaft and for operating the escapements; Fig. 13 is a vertical section through the spring barrel of the carriage motor and a winding drum operated thereby to wind the spring motor; Fig. 14 is a plan of the spring barrel of the carriage motor; Fig. 15 is a similar view partly broken away to show the interior construction of the winding drum; Fig. 16 is a detail view of parts of the devices for connecting the adding and typewriting means with the power shaft; Fig. 17 is a detail view showing a part of the sector operating devices; Figs. 18 and 19 are face views of two cams for controlling the movements of the sector to operate the adding wheels, the smaller being the cam employed for adding one and the larger for adding nine. Fig. 20 is a plan view, with the top part of the machine removed, to show the general arrangement of the parts.

The frame A of the machine is suitably constructed to support the operating parts including the series of keys B, Fig. 1, a motor C, carriage D carrying the usual cylindrical platen P, a carriage motor E for moving the carriage one step on the movement of any key. The carriage carries part of the adding mechanism F of any suitable character. As shown a series of number wheels are on the carriage and a toothed sector 224 on the depressing of a starter hereinafter described is first pushed back and engages the number wheel opposite it, and then down to an extent necessary to record the number indicated on the key struck.

The key board is provided with the usual or any suitable number of lettered keys 35, with a series of numeral keys I which are operated by hand as usual in typewriting to print numerals, and with a series of starters H which are not keys from which the recording or adding devices are actuated, but which serves to set associated parts in position and then make such connection with the motor that the proper recording and adding devices are actuated from said motor. In adding, therefore, the adding and typewriting devices are not moved by the power applied to the starters but by the motor C. The typewriting keys are not actuating agents when the devices are thus motor operated as the recording devices are controlled by the starters and operated by the motor. The row H as shown also includes keys which when depressed do not affect the adding mechanism or motor 0, but operate parts only of the typewriting mechanism, to write certain characters employed in connection with adding such as 0 and the decimal point. The motor C may have the power stored in it from any suitable source but preferably by the movement of the carriage as it is drawn back to position after completing a line. The action of the motor is communicated to the working parts through a rock shaft 174, Fig. 3, which extends across the machine and is supported at its ends by the frame of the machine (see Figs. 6, 7 and 12). From the shaft (see Figs. 2 and 3) extends a series of parallel arms 172. The motor C is supported by a bracket 72 U-shaped in plan view secured to one side of the machine frame. The motor has a casing 73 (see Figs. 6, 8 and 12), turning on a shaft 88 which is supported in bearings in the bracket 72. A pin 98, (Fig. 9) projects from the shaft 88 into a key way in a collar 97 on the shaft. A coiled flat spring 76 is fastened at one end to the collar 97 and at its other end to a pin secured to the casing. A grooved winding drum or barrel 77 is rigidly secured to the back of the casing (Fig. 12) and an escapement wheel 78 is rigidly secured to the winding drum 77. A hub 89 fits loosely on the shaft 88 and bears against the hub 100, of the winding drum and carries a ratchet wheel 80 and star wheel 81. A pawl 85 pivoted on the escapement wheel engages the teeth of the ratchet wheel. The star wheel and ratchet wheel will therefore turn together on the shaft 88. The number of teeth upon the wheels 80 and 81 should be the same.

To hold the parts in place the shaft 88 has a shoulder 101 which abuts against the hub 100, and a washer 95 is fitted on its outer end and is prevented from turning thereon by a pin 102 projecting from the shaft into a groove in the washer. The washer is held against a shoulder 103 on the shaft and against the bracket 72 by a nut 105. The washer is provided with a series of slots 104 in its edge, and a set screw 96 (Fig. 8) passes through one of the slots into the bracket 72, and the shaft and collar 97 are thus prevented from turning under the influence of the spring 76, but by withdrawing the set screw 96 the shaft may be turned to vary the tension of the spring and then again secured.

A bracket 145 (Figs. 8 and 12) is supported by the main frame A and has downwardly projecting ears receiving pivot pins 139, (Figs. 5 and 8). An escapement frame 144 rocks on these pins and carries two escapement dogs 149 and 150, which swing about the axis of a pin 151. The dog 150 is loose on the pin 151 and the dog 149 is fast to it. The dog 150 (Fig. 11) has a short tail 161 adapted to engage the face of the escapement frame when the said dog is in normal position with its upper end pressed forward beyond the end of the dog 149 by a spring 157 as in Fig. 11. The dog 149 is held normally against the face above its pivot by a spring 159 arranged between a tail 160 and said face. The dog 149 is normally engaged by a tooth of the escapement wheel 78 (Figs. 8, 11 and 12) to then prevent the latter from turning, but when the escapement frame is rocked the dog 149 is carried laterally out of contact with said tooth and the dog 150 passes behind said tooth and into position to intercept the following tooth as the escapement wheel turns in the direction of its arrow (Figs. 8 and 11), the upper end of dog 150 being carried back into alinement with dog 149, so that when the frame 144 is swung in the reverse direction, the dog 150 will be carried laterally out of engagement with the tooth and the dog 149 into engagement with it.

The frame 144 is rocked from a transverse shaft 134 (Figs. 5 and 12) by an arm 129 (Figs. 3, 5 and 12) on the shaft which arm carries a bracket 131, at substantially a right angle thereto, from which bracket depends a link 154 pivotally connected at its lower end to an arm 152 extending from the frame 144. An adjustable stop 84 limits the rocking of the said frame.

The casing 73, barrel 77, ratchet wheel 80 and the star wheel 81 will move together under the influence of the spring 76 every time the dog 149 is rocked to release a tooth of the escapement wheel and to transmit rocking movement to the power shaft 174 the latter has an arm 166 (Figs. 6, 10 and 12) which has a roller stud 164 normally resting in the bottom of the space between two teeth on the star wheel 81, and when the star wheel 81 turns in the direction of the arrow, Fig. 10, the curved side of a tooth, acting as a cam on the roller stud 164, will depress the arm 166, and thereby rock the shaft 174 and swing the outer ends of all the arms 172 fixed to shaft 174, downwardly. The return movement of the power shaft is effected by a spring 188, Figs. 10 and 12.

To utilize the return movement of the carriage to wind up the spring 76, the drum of the carriage motor E is connected by a cord or strap 140 with the winding drum or barrel of the motor C, and one end of a strap 148 is attached to the barrel 47 of the motor E, the other end of said strap being attached to the typewriter carriage whereby to drive the carriage step by step, as it is released, in the usual manner. At the bottom of the barrel 47 of the motor E is a boss 52, Fig. 13, which has its lower end threaded to receive an arm 53 and on the boss between the arm 53 and the bottom of the barrel turns a winding drum 50, with a peripheral groove, and one end of the cord 140 is attached to the drum and passes round an idler pulley 68, Fig. 1, to the board 77 to which the other end is secured in any suitable manner. The parts are so arranged that when the spring 76 is unwound, the cord 140 will be wound on the barrel 77 and off the drum 50, and when the carriage is at its extreme left hand position the strap 148 will be wound on the barrel 47 and the spring in the barrel will be unwound.

The winding drum 50 is open at the face which is against the bottom of the spring barrel 47, Figs. 13 and 15, and it is provided with two annular spaces 91 and 71 concentric with its hub, and in the space 91 is secured a stud 49, Fig. 15, and another stud 48 secured to the bottom of the barrel 47 projects into said space behind the stud 49. If, therefore, the carriage be moved by hand from left to right the barrel 47 will be turned in the direction of the arrow, Fig. 14 or 15, and the strap 148 will unwind from said barrel and by the engagement of stud 48 with stud 49 the winding drum 50 will be turned to wind the cord 140 on to it and from the drum 77, which will result in winding up the spring 76 by the movement of the carriage during which movement the teeth of ratchet wheel 80 will pass the pawl 85 which will yield to permit them to do so, and the teeth of the escapement wheel will pass the dog 149 which also yields. The ratchet wheel 80, Fig. 10, is held frictionally against movement, by the cam roll 164 normally resting in the space between two teeth of the star wheel 81, where it is held by the spring 183 connected at its lower end to the arm 166 and its upper end to a pin 182 on the frame, Figs. 6 and 10. To maintain the cord 140 taut, a flat spring 75, Figs. 13 and 15, is coiled in the annular recess 71 in the drum 50, one end of said spring being connected to a pin 92 in the drum and the other end to a pin 93 secured to the winding barrel 47, and the tendency of this spring is always to turn the drum 50 to wind the cord 140 thereon, no matter what may be the positions of the barrel and drum relatively to each other.

The typewriting means and the computing means and he controller means may be of any suitable character. As shown each starter stem 1, Figs. 3 and 4, is suitably supported to slide vertically along side of a standard 28. Each starter stem is held in its elevated or normal position by a spring 210, Figs. 6 and 7, connected at the lower end to a clip 211 secured to the starter stem and at its upper end to a pin 209 projecting from the adjacent standard 28, Figs. 6, 7 and 12. The clip 211 is U-shaped to permit the arm 172 to swing between the spring and adjacent starter stem and secure a compact construction.

As shown in Figs. 2 and 3, the starter stems are flat and each is provided with a locking projection 147, a cam 6, and ratchet teeth 2 on its rear edge, and with a rack 262 at its front edge and the cam 6 is inclined at its lower end. When one starter is being depressed, it is desirable to lock all the other starters against depression and this is effected by swinging a bail 11 under the projections 147 of all the starters except the one being depressed. The bail 11 is carried by two arms 14, Figs. 4 and 5, which are rigidly connected to the ends of a rock shaft 9 rocking in supports carried by the main frame. A series of arms 8, one for each starter, rigidly connected to the shaft 9 project forwardly into proximity with the respective starter stems just below the cams 6, when the starters are in normal position. One of the arms 14 is provided with a projection 16, Fig. 4, below the shaft 9 and a spiral spring 20 is connected at one end to the said projection and at the other end to the main frame, and holds the arms 8 in the paths of the inclines of the cams and said projection is limited in its movement towards the stems 1 by pin 7 with which the projection 16 contacts. When a stem 1 is depressed, the cam 6 will force the arm 8 rearwardly and thereby rock the shaft 9 and swing the bail 11 under the projections 147 of all the stems not depressed and over that of the depressed stem; and when the stem again rises to normal position as the cam 6 passes above the free end of arm 8 the spring 20 will move the bail 11 out of the path of the projections 147 and leave all the starters free to be depressed. The cam 6 is so placed upon stem 1 that the arm 8 will not come into contact with the incline of the cam until the projection 147 on the depressed stem has passed below the bail 11 and said cam is of such length that the arm 8 will be maintained in contact with it during the remainder of the stroke of the stem. On the return of the stem, the arm 8 will leave the cam 6 just before the projection 147 reaches the bail.

It is desirable that the computing mechanism shall have a complete movement at each operation and for this purpose I provide a pawl 10, Figs. 2 and 3, which prevents a starter, after it has been partially depressed, from rising until the mechanism has completed its movement. The pawl 10 is pivoted at 24 on the adjacent standard 28, and its point 29 is normally held in engagement with the rear edge of the stem 1 by a spring 26 connected at its lower end to the pawl at one side of its pivot 24 and at its upper end to the standard 28 in line with the pivot. The pawl is provided with an arm 32 projecting across the stem in position to be engaged by a pin 33 on the stem on the down stroke of the latter and by a pin 34 on the stem on its up stroke. The ratchet teeth 2 are so arranged on the stem that the end of the pawl 10 will not engage them until after the bail 11 has been moved to lock the other starter against depression, after which the pawl will engage the teeth and prevent the return of the starter until after it has completed its stroke. Just before completion, the pin 33 will strike the arm 32 and throw the lower end of pawl 10 out of engagement with the teeth 2 and the spring 26 swinging to the opposite side of the center 24 will hold it out of engagement until the pin 34 strikes the arm 32 just before the key 1 completes its upward movement and the pawl will then be returned to working position.

The adding wheels, which may be of any preferred form and any desired number, in the present case are indicated each simply by a gear wheel 247, it being understood that there will be one gear wheel for every adding wheel desired and which gear wheels may themselves be adding wheels or they may be connected to adding wheels.

Each stem 1 is provided with a pair of pawls 108 and 106 (Fig. 3), said pawls being pivoted independently on the stem and extending upwardly and downwardly, respectively, and held yieldingly against stop pins 127 by a spring 123. On the adjacent standard 28 a cam disk 110 is rotatively supported on a stud 122, Figs. 3, 4 and 12, and has a recess 112 in its edge into which a pin 111 projects from the standard 28 and limits the movement of the cam in either direction. The cam also has shoulders 115 and 116, the latter so located that it will be struck by the pawl 106 when the stem 1 is depressed and the cam will thus be turned by the pawl to the extent permitted by the pin 111. On the up stroke of the stem the shoulder 115 will be in position to be struck by the pawl 108 which will effect the reverse movement of the cam. The disk 110 is held in either of its extreme positions by a spring 125 connected at its lower end to the disk and at its upper end to pin 124 on the standard 28.

To insure that the motor C shall operate the typewriting and adding means on the depressing of a starter, the cam disks 110 are provided with recesses 113 in which lies normally a rod 117 that extends past all the disks and moves the escapement frame but when any disk 110 is turned by the pawl 106 on the down stroke of the starter, the rod 117 will be forced downwardly and out of the recesses 113. As this rod extends across the machine it will be operated no matter which starter is depressed, and it is supported at its ends by two arms 128, 129, Figs. 5, 6, 7 and 12, which are secured to the shaft 134. On this shaft about midway of its length are secured two parallel separated arms 218, 219, Figs. 3, 5 and 17. The sector arm 141 is pivoted between the upper ends of the arms 218 and 219, and near the pivoted end the said arm is bent downwardly to pass below a shaft 252, Figs. 3 and 4 and this bent portion swings between the arms 218 and 219 when the sector is moved up and down and the arms therefor guide the sector laterally. A spring 243 is connected at its upper end to an ear 240 at the end of the sector arm, and at the lower end to a toe extending from the shaft 134 and said spring tends normally to hold the sector in its highest position. A spring 170 is connected at one end to the frame of the machine and at its other end to an ear on the shaft 134 and tends normally to pull the upper ends of said arms toward the front of the machine and hold the sector out of engagement with the adding wheels. The function of the arms 172 is to operatively connect the separate typewriting and computing mechanisms to the power shaft 174 so that each may be operated therefrom. There is one arm 172 for each starter and the function of said arms is performed in the construction shown by pulling down a starter after it has been partially depressed by the operator's finger and in also pulling down the connections of a corresponding typewriting key 35, for which purpose the arm is provided with a pin 177 at its outer end.

As shown in Figs. 2, 3, 7 and 16, each stem 1 has pivoted thereto a hook 146 with a rear projection carrying a stud 44. The hook 146 has a tail piece 199 normally pressed against a fixed stop 39 by a spring 173, Fig. 16. To the sliding support 300 of each key 35 is pivoted an arm 37 forked and having a hook 42 at its lower end, and between the forks extends one of the studs 44. When a numeral key used in typewriting, is depressed the arm 37 will slide up and down freely over the stud 44. When a starter is depressed it carries down the hook 146, and the tail piece 199 by its tendency to keep in contact with the stop 39 will cause the hook 146 to swing on its pivot and its lower end will move toward the pin 177, and carry the lower end of the arm 37 with it, thus bringing the hook 42 as well as its own hook 146 under the pin 177, and when the power shaft rocks, the pin 177 will engage both hooks carry down starter and the key 35 and connections and operate both the typewriting and computing mechanisms.

It will be seen that the operations of typewriting the figures indicating the amounts to be added, and of shifting the numeral wheels or other means for indicating the sums of said amounts, are not effected by the power of the operator but are effected from the motor which is put into connection with the typewriting devices and adding wheels by the act of depressing the starter and that this in no way interferes with the ordinary operations of the typewriter, the numeral type of which however are the means of recording in both cases, that is both by a motor and by hand operations. It will also be evident that whatever may be the power required to operate the adding means the force required of the operator to actuate the starter is no greater than that required to operate the typewriter keys.

It will be seen that the starters are not normally type bar actuating keys, nor means for actuating the adding devices; but are the means of effecting connection of the motor with the typewriting and adding devices.

The sector 224, Fig. 3, has an elongated opening 246 through which a guide rod 225 extends, said rod being supported by the frame at its opposite ends. The slot is wider than the diameter of the rod 225 to permit the sector to move into and out of engagement with the pinions 247, the sides of the slot being arcs struck about the pivot of the sector as a center. On the rod 225 are guide collars 226, Figs. 3 and 5, which have lips loosely engaging the sector on opposite sides. One of the guides has an extension 230 upon which is pivoted an arm 232 having a lip 250 which engages the side of the guide 230 and limits the movement of the arm 232 toward the sector 224 under the influence of a spring 234 coiled around the pivot of the arm. The arm 232 is also provided with a laterally extending lip 251 Fig. 5 adapted to fit under a pin 229 Figs. 3 and 4 on the sector. The lip 251 is beveled on its under side so that when the sector makes its stroke upwardly the pin engaging the beveled side will force the arm 232 laterally out of its way until it has passed above it when the arm will swing in below the pin and will support the sector in its normal position. A headed pin 231, Fig. 5, limits the outward movement of the arm 232.

There is a rock shaft 252 rotatably mounted in the frame, Figs. 3, 5 and 7, and rocked at each adding operation, said shaft carrying a series of arms 215 each having a cam roll 217, Fig. 3, at its outer end. The arms move with the shaft. There is also an arm 222, Fig. 5, rigidly secured on the shaft 252, near the middle of the latter, and offset to not interfere with the adjacent arms 218 and 219. This arm 222 extends along in close proximity to the sector and is provided at its outer end with a slot 235, Figs. 3 and 5, through which a headed screw 223 extends into the sector arm. The arm 222 will thus cause the sector arm to move up and down with it but the sector arm can move independently to and from the pinions 247.

Upon a stud 256, Fig. 3, projecting from each standard 28 is pivoted a cam 241 and a gear wheel 258 is secured to the cam, and the rack 262 on the adjacent starter stem engages the gear wheel 258. Each cam has a cam track 264 extended to form a clearance slot 265 for the cam roll 217 on the arm 215. There are nine of the cams, one for each numeral, and the throw of the cams increases in progressive order, so that the cam for numeral nine has nine times as much throw as the cam for numeral one. In Figs. 18 and 19, I have shown the cams for one and nine. The cam tracks 264 are such as to bear upon the rolls 217 on opposite sides in all positions of the cams and rolls, except that there may be small clearances in the extensions 265, and each track extends beyond its effective point in both directions. The rolls and therefore the sector, are positively driven to and from all positions both in their operating and return movement, so that the sector is positively and definitely shifted. This is an important consideration in connection with the operation of the machine. If the movements of the sector were not so constrained, there would be great danger of improper engagement of the sector with gears 247 and corresponding inaccuracy of the machine would result.

Normally the cam roll 217 occupies a position in the cam track 264 as indicated in Fig. 3. When a starter is depressed, its corresponding cam is caused to rotate in the direction of the arrow, Fig. 18, by the engagement of the rack 262 on the stem with its corresponding pinion 258, but the cam track will be ineffective on the roll 217, except to guide it, until the point 260 is reached, Figs. 18 and 19, and the complete throw of the cam is accomplished when the point 261 is reached. The remainder of the track 264 having its side arcs struck about the pivot of the cam, merely operates to secure the sector against vertical movement. When a starter is depressed, it will rotate its cam, and the cam roll 217 and arms 215 coöperating with it, will be depressed to an extent corresponding to the throw of the cam, and the shaft 252 will be rocked, and through the arm 222 the sector will be correspondingly depressed and an adding wheel 247 turned to the extent required to add a number corresponding to that of the starter depressed. All of the cam rolls 217 move up and down together uniformly at each operation of the machine and the clearance spaces 265 permit all inoperative cam rolls to have this movement although the adjacent cams are stationary.

It will be noted that when the arm composed of pieces 218 and 219 is rocked, the end of the sector arm has a vertical movement at the pivotal point 221. If the sector arm turned on the screw 223 as a fulcrum, it will be evident that vertical movement of the pivotal point 221 would ordinarily cause opposite vertical movement of the sector 224. It is desirable, however, for smoothness of operation in throwing the sector into engagement with the wheels 247 that the sector should move in a horizontal direction only and this is accomplished by cutting the slot 235 at such an angle that the vertical movement of the pivotal point 221 will not lift or depress the sector end of the arm.

While I have described certain parts which are effective in connection with the power operated typewriting and adding means it will be evident that some of them will be serviceable when the operating shaft is moved by hand.

I have not described or shown the details of the typewriter mechanism as these may be of any suitable and ordinary character to secure the proper operation of type carriers shown as bars 220 with relation to the platen P.

In the construction as described, the operation is as follows:—Assuming the springs 76 to be wound and the carriage at the right hand end of the machine, the typewriting mechanism may be operated as usual without affecting the adding mechanism, and the barrel 47 will draw on the strap 148 and so move the carriage in its step by step movement without affecting the position of the drum 50 or drum 73. As many lines may be printed as desired without affecting these drums, for the stud 48, Fig. 15, will move away from the stud 49 and back to it again every time a line is printed and the carriage returned. If, however, at any period in the traverse of the carriage, it is desired to record and add figures, the proper starter will be depressed by the finger of the operator, and the first resultant action is the partial rotation of a cam 241, which is, however, ineffective at this stage of its movement. The point of the pawl 106 next strikes the shoulder 116 of the cam 110 and rotates the latter, thereby forcing the rod 117 down out of the recess 113. This results in depressing the arms 128 and 129 and rocking the shaft 134. The rocking of the shaft causes the upper ends of arms 218, 219, to swing rearward, thus moving the sector into engagement with the opposed pinion 247. This movement of the sector frees the pin 229 from the lip 251 and the sector is free to be moved downward. While these movements are taking place, the hooks of the adding and typewriting mechanisms have swung into position to couple both mechanisms to the pin 177 on the power arm 172, and the cam 6 on the stem has operated to move the bail 11 under the locking points of all stems except the one depressed, and over the point of the one depressed. The pawl 10 has also engaged the ratchet teeth 2 and prevents the return of the starter until after it has completed its stroke. These are the only operations which result from the act of the operator upon the starter and do not move either the type levers or the adding wheels. After the completion of these various movements, however, the escapement frame 144 will be rocked sufficiently to move the dog 149 out of engagement with the tooth of the escapement wheel, thus releasing the latter and the motor. The star wheel in turning with the motor rocks the operating shaft 174 which operates the adding mechanism and also the typewriting mechanism to print the number added, and, in the mechanism shown, in so doing pulls down the starters. After the operating shaft begins to act on the adding mechanism, the throwing part of the cam 241 will operate on the cam roll 217 to depress its arm 215 and rock the shaft 252, thereby moving the sector downwardly and turning the adding wheels the desired distance. As the cam rack 264 extends beyond its effective point in both directions, the cam can turn as the sector is pushed into engagement with the pinion 247 without moving the sector up or down, and the starter may have further movement after the sector has been moved downwardly the required amount without moving the sector. Just before the starter reaches the end of its down stroke, the pin 33 will strike the arm 32 and throw the pawl 10 out of engagement with ratchet teeth 2 and the starter is then free to move up under the pull of its spring 210. The point of the pawl 108 will strike the shoulder 115 of the cam 110 and turn the cam to bring the recess 113 over the rod 117 and the spring 170 acting on arms 218 and 219, rocks the shaft 134, which pulls the sector out of engagement with the pinion 247, lifts the bar 117 into the recess 113, and rocks the dog arm 144 to disengage dog 150 from, and engage the dog 149 with, the tooth of the escapement wheel 78. During these operations the cam 241 has been rotating, but without effect upon the cam roll 217, and it now begins to exert its effect upon the roll 217 and the sector is lifted through the agency of the cam and also the spring 243, and when the pin 229 reaches the lip 251 on the arm 232 it will push the latter aside and pass above it, and the arm 232 will at once return to normal position with its lip 251 under the pin 229. As the key moves upwardly, the tail piece 199 of the hook 146 will strike the arm 39 and throw the hook and also the hook 42 from under the pin 177, which in the meantime has been returned to normal position by the rocking of the shaft 174, when the spring 183 will pull the cam roll 164 upon the arm 166 into the recess between two teeth on the star wheel 81 and hold the parts in place.

I wish it to be understood that by the term "typewriter" as used herein I mean a machine of suitable construction provided with letter and numeral type for printing both reading matter and numbers, and in which the movement of each key is transmitted to print the letter or number represented by said key. It is with a typewriter as thus defined that I combine an adding mechanism and a motor which will actuate both the adding mechanism and the type mechanism although certain features of my invention are not limited to this combination.

Without limiting myself to the precise details of construction illustrated and described, I claim:

1. The combination with typewriter mechanism, capable upon the actuation of a key, of recording the character represented by said key, and a computing mechanism, of a motor and connections adapted to operate both said typewriting and computing mechanisms, and means operated on shifting the typewriter carriage for storing power in the motor.

2. The combination with typewriter mechanism, capable upon the actuation of a key, of recording the character represented by said key, and a computing mechanism, of a motor and connections adapted to operate both said typewriting and computing mechanisms, said typewriting mechanism being operable independent of said motor and computing mechanism.

3. The combination with typewriter mechanism, capable upon actuation of a key, of recording the character represented by said key, and a computing mechanism, of a motor and connections adapted to operate both said typewriting and computing mechanisms, said typewriting mechanism being operable independent of said motor and computing mechanism, and a series of starters adapted to effect a connection of the motor with both the typewriting mechanism and the computing mechanism.

4. The combination with typewriter mechanism, capable upon the actuation of a key, of recording the character represented by said key, and a computing mechanism, of a motor and connections adapted to operate both said typewriting and computing mechanisms, a series of keys adapted to operate the typewriting mechanism independently of the computing mechanism, and a series of starters for effecting connection of the motor with both said typewriting and computing mechanisms.

5. The combination of typewriter mechanism including numeral and letter type and capable upon the actuation of a key of printing the character represented by said key, a computing mechanism, a motor and connections adapted to operate both the computing mechanism and the numeral printing devices of the typewriter, and a series of starters for effecting connection of the motor with the computing and typewriting mechanisms.

6. The combination of typewriter mechanism including numeral and letter type and capable upon the actuation of a key of printing the character represented by said key, a computing mechanism, a motor and connections adapted to operate both the computing mechanism and the numeral printing devices of the typewriter, and a series of starters each adapted to effect a connection of the motor with the computing mechanism and with the means connecting a numeral key of the typewriting mechanism with its printing devices.

7. The combination of typewriter mechanism adapted to print letters and numerals and including both letter and numeral keys and adapted upon the actuation of a key to print the character represented by said key, a computing mechanism, a motor and connections adapted to operate both the computing mechanism and the numeral printing devices, and a series of starters each adapted on partial depression to effect a connection of the motor with its computing mechanism and with the means connecting a numeral key with the printing devices, said numeral keys and printing devices actuated thereby being operable independently of the motor.

8. The combination with the recording devices of a typewriter and a series of keys each adapted to operate said recording devices to record the character represented by the key, of an adding mechanism, a power shaft normally held against movement, and a series of starters adapted to release said shaft and effect a connection with said shaft of the adding mechanism and with the means by which numeral keys of the typewriter control the recording of such numerals.

9. The combination of a motor, a power shaft operated by said motor and normally held against movement, adding mechanism, starters, means adapted to be operated on a partial depression of a starter for connecting said adding mechanism to the power shaft, and for causing the motor to operate the power shaft, to effect the complete operation of the said mechanism, substantially as described.

10. In an adding typewriter, the combination of starters, adding mechanism, typewriting mechanism, a motor, means for connecting the adding and typewriting mechanisms to the motor to effect the operation of said mechanisms, and means operated by the movement of the typewriting carriage for storing power in said motor, substantially as described.

11. In a computing typewriter having a motor, typewriting mechanism operated thereby, a platen and carriage, and means for storing up power in the motor on the movement of the carriage, substantially as described.

12. In an adding typewriter machine, the combination of adding and typewriting mechanisms, starters, a paper carriage, a motor, devices operated by the motor for operating said mechanisms, and means operated by said carriage on its return movement for storing power in said motor, substantially as described.

13. In an adding typewriter, the combination of adding and typewriting mechanisms, a paper carriage, a spring motor, devices operated by said motor for operating said mechanisms, a spring motor for moving the carriage in one direction, and connections between the two motors and the carriage for storing power in both motors, on the movement of the carriage in the opposite direction, substantially as described.

14. In an adding machine, the combination of adding and typewriting mechanisms, a paper carriage, a spring motor for operating said mechanisms, a spring motor for moving said carriage in one direction, and connections between the two motors and the carriage for storing power in both motors by the movement of the carriage in the opposite direction, substantially as described.

15. In an adding typewriter machine, having typewriting and adding mechanism, the combination with a spring motor for operating the adding and typewriting mechanisms, and a winding drum rigidly connected thereto, of a carriage, a spring motor for moving said carriage in one direction, a winding drum adjacent to the carriage motor and movable in one direction independently thereof, means for transmitting movement from the carriage motor to the adjacent drum when the carriage is moved in the opposite direction, and a cord connected to both drums and operative to store power in the motor for actuating the said adding and typewriting mechanisms when power is stored in the carriage motor, substantially as described.

16. In an adding typewriter, the combination with typewriting mechanism including a sliding carriage, and adding mechanism, of a spring motor for operating the adding and typewriting mechanisms, a second spring motor for moving the carriage, a winding drum rigidly connected to the motor for operating said mechanisms, a winding drum movable with the carriage motor in one direction and independently thereof in the other direction, a cord connected to both drums to transmit movement from one to the other, and a coiled spring connected at one end to the carriage motor and at its other to the adjacent drum and normally tending to wind said cord on to the drum to which it is connected, substantially as described.

17. In an adding typewriter machine, the combination with adding mechanism and typewriting mechanism, of starters, a motor for operating said mechanisms, an escape wheel for the motor, an escapement for controlling the escape wheel, and means operated on the partial depression of said starters for operating said escapement, substantially as described.

18. In an adding typewriter machine, the combination with an adding mechanism and a typewriting mechanism, of starters, a motor for operating said mechanisms, an escape wheel for the motor, an escapement for controlling the escape wheel, and means operated on the depression of said starters for operating said escapement, substantially as described.

19. In an adding typewriter machine, the combination with an adding mechanism and a typewriting mechanism, of starters, a motor for operating said mechanisms, an escape wheel for the motor, pivotally supported dogs for controlling the escape wheel, and means operated on a partial depression of one of said starters for rocking said dogs, substantially as described.

20. In an adding typewriter machine, the combination with an adding mechanism and a typewriting mechanism, of starters, a motor for operating said mechanisms, an escape wheel for the motor, pivotally supported dogs for controlling the escape wheel, and means operated on a depression of one of said starters for rocking said dogs, substantially as described.

21. The combination of adding wheels, adding mechanisms for turning said wheels, starters, a motor for operating said mechanisms, an escape wheel for the motor, an escapement for controlling the escape wheel, cams, a pivotally supported rod engaging all of said cams, means controlled by said starters for operating said cams to move the rod, and connections between the rod and escapement for operating the latter, substantially as described.

22. The combination with typewriting and adding mechanisms of a computing typewriter, of a motor for operating the same, a series of numeral starters, an escapement device for permitting the motor to move step by step, and connections whereby to shift said device on the partial depression of any starter, substantially as described.

23. The combination of adding mechanism, starters, a motor for operating said mechanism, cams, a movable rod engaged by all of said cams, means for operating said cams from the starters to control the movements of the rod, an escapement device for the motor, and connections between the rod and the escapement device, substantially as described.

24. The combination with the typewriting and adding mechanism of a computing typewriter, of a motor for actuating the same, an escapement controlling the motor, a series of starters, cams and means for operating them independently from each of said starters, and means for shifting the escapement by the action of anyone of said cams, substantially as described.

25. The combination of adding wheels, controller keys, a sector, for operating the wheels, pivoted on arms connected to a rockshaft, yielding means for holding said sector away from the wheels, cams, a rod carried by arms mounted on the rock shaft and normally engaging all the cams, and oppositely disposed dogs controlled by said keys to operate the cams to control the up and down movement of the rod, whereby the shaft is rocked and the sector moved toward or away from the adding wheels, substantially as described.

26. The combination of adding wheels, starters provided with racks, a rock shaft, arms secured to the rock shaft and each having a cam roll, rotatable cams each engaging a cam roll, a pinion rigidly connected to each cam and meshing with a starter rack, a sector for operating the wheels, and an arm secured to the rock shaft and connected to the sector to permit the forward and backward movement of the latter, substantially as described.

27. The combination of adding wheels, a sector for actuating them, starters, a rack on each starter, a standard adjacent each rack, a cam rotatably supported on each standard, a gear connected to each cam and meshing with a rack, a rock shaft, arms connected to the shaft and each arm having a cam roll engaging one of the cams, the cams being constructed to have an extended movement in each direction without operating the rolls, and an arm fast on the rock shaft connected to the sector, whereby when any starter is depressed its corresponding cam will be rotated and all of the cam arm and the sector arms will be moved equal distances, substantially as described.

28. The combination of an adding wheel, a sector for rotating it and normally out of engagement therewith, a starter, a rack, a rotatably supported cam, a gear rigid with the cam and meshing with the rack, a rock shaft, an arm connected to the shaft and having a cam roll engaging the cam, a motor for operating the starter and rack and normally held against movement, and means operated on a partial depression of the starter for moving the sector into engagement with the wheel and for releasing the motor to complete the movement of the rack, and an arm connecting the rock shaft and sector, substantially as described.

29. The combination of an adding wheel, a sector for operating it and normally out of engagement therewith, said sector having a curved slot, a fixed guide rod extending through the slot and of less diameter than the width of the slot, guides for the sector connected to the rod, a shoulder on the sector, an arm pivoted on one of the guides and having a lip spring pressed against the sector, said lip adapted to engage with said shoulder and having an inclined lower face, means for moving the sector to engage it with the adding wheel and disengage the shoulder from the lip, means for moving the sector downwardly to turn the wheel, and means for disengaging it from the wheel and moving it upwardly past the lip, substantially as described.

30. The combination of an adding wheel, a sector for operating it, a rock shaft, a pair of curved arms rigidly connected to the shaft and between the upper ends of which the sector arm is pivoted, said arm being bent near its pivot and the bent portion lying between the arms to be guided thereby, and means for swinging the sector vertically on its pivot, substantially as described.

31. The combination of an adding wheel, a sector for operating it pivoted on a swinging arm, yielding means for holding the sector out of engagement with the wheel, a rock shaft, an arm fast on the rock shaft and having a slot and pin connection to the sector, whereby the sector may move to and from the wheel independently of the arm, means for moving the sector to and from the wheel, and means for rocking the rock shaft, substantially as described.

32. The combination of a starter having a vertically movable stem, and a post supported adjacent thereto, said stem having ratchet teeth on one side, a pawl pivotally supported on the post and having an arm extending across the stem, pins on the stem to respectively engage the arm when the stem is near the limit of its movement in both directions to move the pawl into or out of engagement with the side of the stem, and a single spring for holding the pawl in either of its positions, substantially as described.

33. In an adding typewriter machine, the combination of a power shaft, an arm fast thereon provided with a lateral projection at its outer end, an adding mechanism, a typewriting mechanism, means for connecting both mechanisms to the projection on said arm, and a motor for operating the shaft, substantially as described.

34. In an adding typewriter machine, the combination of a power shaft, an arm fast thereon provided with a projection at its outer end, an adding mechanism, a typewriting mechanism movable independently of the adding mechanism to write, starters, connections movable by a partial depression of a starter, to connect both mechanisms to the power shaft, and a motor for operating the shaft, substantially as described.

35. In an adding typewriter machine, the combination of a power shaft, an arm fast thereon provided with a projection at its outer end, an adding mechanism, a typewriting mechanism, a forked hook pivotally connected to an element of the typewriting mechanism, a hook pivotally connected to a part of the adding mechanism and having a pin projecting between the forks of the other hook, a starter, means actuated on a depression of the starter for engaging both hooks with the said projection, and a motor for operating the shaft, substantially as described.

36. The combination with the adding and typewriting mechanisms of a computing typewriter, of starters, a motor for operating both mechanisms, and devices whereby the starters are automatically engaged with devices connecting the motor with both mechanisms when partially depressed, substantially as described.

37. In an adding typewriter machine, the combination of a spring motor, an escapement wheel therefor, dogs for controlling the said escapement wheel, a power shaft connected to said motor an arm fast on the power shaft, an adding mechanism, a typewriting mechanism, a starter, means operated on depression of the starter for connecting both mechanisms to said arm, and means also operated on said depression for operating the dogs to release the motor, substantially as described.

38. In an adding typewriter machine, the combination of a spring motor, an escapement wheel for the motor, an escapement device controlling the escape wheel, a star wheel rigidly connected to the escape wheel having cam teeth, a power shaft, an arm rigidly connected to said power shaft and having a cam roll yieldingly held between two teeth of the star wheel, another arm also rigidly connected with the power shaft, an adding mechanism, a typewriting mechanism, a starter, means operated on a depression of the starter to connect both mechanisms to the last named arm, and means also operated on said depression to operate the escapement, substantially as described.

39. In an adding typewriter machine, the combination of adding and typewriting mechanisms, a rock shaft, means for operatively connecting the rock shaft to said mechanisms, a spring motor, an escapement wheel for said motor, a star wheel rigidly connected to the escapement and having cam teeth, and an arm fast to the rock shaft engaging said teeth of the star wheel, substantially as described.

40. In an adding typewriter machine, the combination of a series of starters, adding wheels, a sector for turning said wheels normally held out of engagement therewith, a motor, means operated on a depression of one of said starters for locking all the other starters against depression, means also operated on said depression for moving the sector into engagement with an adding wheel, and means also operated on said depression for connecting the said sector operatively with the motor, substantially as described.

41. In an adding typewriter machine, the combination of a series of starters, adding wheels, a sector for turning said wheels normally held out of engagement therewith, a motor, means operated on a depression of one of said starters for locking all the other starters against depression, means also operated on said depression for moving the sector into engagement with an adding wheel, means also operated on said depression for connecting the said sector operatively with the motor, and means for arresting the motor after one complete action of the adding mechanism, substantially as described.

42. In an adding typewriter machine, the combination of a reciprocating starter having a stem, a rocking arm 172 adapted to engage said stem and move it in one direction, a clip 211 secured to said stem and projecting laterally therefrom, and a spring 210 having one end attached to said clip and the other end attached to a stationary part of the machine, said clip being bent to permit the arm 172 to operate between the stem and spring.

43. In an adding typewriter machine, the combination of a sector for actuating the adding mechanism, an arm 215 adapted to rock said sector, a pivotally mounted disk 214 having a cam slot formed therein and closed at its ends, means for rocking said disk about its pivot, and a roll 217 projecting laterally from the arm 215 and extending into said cam slot, whereby all movements of the said arm 215 are positively controlled and it is held in continuous engagement with the cam.

44. In a combined typewriter and adding machine, the combination with the movable numeral type and an adding mechanism, of means adapted to operate the adding mechanism to accumulate the value represented by any of said numeral type, simultaneously with the printing operation of said type, a motor for moving said parts when the value of the numeral printed is to be accumulated, and manually operable means for moving each of said type when the value represented thereby is not to be accumulated.

45. The combination with a typewriting machine having both numeral and letter type of an adding mechanism, a motor adapted to operate any of the numeral type and the adding mechanism to simultaneously print the numeral and accumulate the value represented thereby, and manually operable keys for operating all of the type.

46. The combination with a typewriting machine having both numeral and letter type, and independent keys each adapted to move one or more of such type to printing position, of an adding mechanism, a motor, means operated by the motor for simultaneously moving any of the numeral type to printing position and accumulating the value represented thereby, and means for preventing operation of said motor while the letter type are in use.

47. The combination with a typewriting machine having both numeral and letter type and independent keys each adapted to move one or more of said type to printing position, of an adding mechanism, a motor, means for connecting the support or carrier of any of the numeral type with the motor and causing the latter to simultaneously move the numeral type to printing position and actuate the adding mechanism to accumulate the value of said numeral, and means for preventing operation of the motor when any numeral type is moved to printing position without accumulating the value represented by said numeral.

In testimony whereof I have signed my name to this specification in the presence of two subscribing witnesses.

EDWIN B. CRAM.

Witnesses:
W. FRANK CARTER,
WM. G. MCCARTY.